US008224793B2

(12) United States Patent
Bonacci et al.

(10) Patent No.: US 8,224,793 B2
(45) Date of Patent: Jul. 17, 2012

(54) REGISTRATION IN A DE-COUPLED ENVIRONMENT

(75) Inventors: Mark P. Bonacci, Charlotte, NC (US);
Michael E. Brown, Charlotte, NC (US);
Fred T. Clewis, Stanley, NC (US);
Victor S. Leith, Stanley, NC (US)

(73) Assignee: International Business Machines Corporation, Armonk, NY (US)

( * ) Notice: Subject to any disclaimer, the term of this patent is extended or adjusted under 35 U.S.C. 154(b) by 1446 days.

(21) Appl. No.: 11/160,637

(22) Filed: Jul. 1, 2005

(65) Prior Publication Data
US 2008/0010644 A1    Jan. 10, 2008

(51) Int. Cl.
*G06F 7/00* (2006.01)
(52) U.S. Cl. ........................................ 707/694
(58) Field of Classification Search .............. 707/103, 707/102, 769
See application file for complete search history.

(56) References Cited

U.S. PATENT DOCUMENTS

| 5,367,670 | A | * | 11/1994 | Ward et al. ................. 714/47 |
| 5,752,031 | A | * | 5/1998 | Cutler et al. ................. 718/103 |
| 5,964,837 | A | * | 10/1999 | Chao et al. ................. 709/224 |
| 6,286,027 | B1 | | 9/2001 | Dwyer, III et al. |
| 6,598,225 | B1 | | 7/2003 | Curtis et al. |
| 6,754,704 | B1 | | 6/2004 | Prorock |
| 6,842,756 | B2 | | 1/2005 | Park et al. |
| 2001/0050543 | A1 | * | 12/2001 | Zeilinger ................. 320/137 |
| 2002/0035626 | A1 | | 3/2002 | Higuchi |
| 2002/0078378 | A1 | | 6/2002 | Burnett |
| 2002/0129144 | A1 | | 9/2002 | Barsness et al. |
| 2002/0156932 | A1 | | 10/2002 | Schneiderman |
| 2002/0165878 | A1 | | 11/2002 | Lam |
| 2002/0199179 | A1 | | 12/2002 | Lavery et al. |
| 2003/0028680 | A1 | * | 2/2003 | Jin ................. 709/313 |
| 2004/0003078 | A1 | | 1/2004 | Todd et al. |
| 2004/0015620 | A1 | * | 1/2004 | Brown et al. ................. 710/19 |
| 2004/0015812 | A1 | | 1/2004 | Sreedhar |
| 2004/0255303 | A1 | | 12/2004 | Hogan et al. |

FOREIGN PATENT DOCUMENTS
EP        1418503 A1 *  5/2004

OTHER PUBLICATIONS

T. Sundsted, An Introduction to the Observer interface and Observable class using the Model/View/Controller architecture as a Guide, Observer and Observable, www.javaworld.com Oct. 1996.
T. Sintes, Speaking on the Observer Pattern—How can you use the Observer pattern in your Java design?, www.javaworld.com May 2001.

* cited by examiner

*Primary Examiner* — Truong Vo
(74) *Attorney, Agent, or Firm* — Charles L. Moore; Moore & Van Allen PLLC

(57) ABSTRACT

A method, system and computer program product for registration in a de-coupled environment or system may include providing an identity of a spawned component to a manager. The method, system and computer program product may also include taking a predetermined action in response to the spawned component failing to report its status to the manager after a preset time period.

1 Claim, 4 Drawing Sheets

REGISTRATION IN A DE-COUPLED ENVIRONMENT

BACKGROUND OF THE INVENTION

The present invention relates to systems where components are de-coupled or do not communicate directly with one another, and more particularly to a method and system for registration in a de-coupled environment or system.

In a purely decoupled environment, components are unaware of each other. There is no exchange of state information directly between controlled components. The operation of each component occurs in a completely 'stand alone, pluggable' fashion. Existing components can be removed or new components can be added to the system without affecting any other existing component. Each component operates independently and has a direct interface only to a central manager or controller. No other formal interface is required between sibling components. Each component reports status to and receives status from the manager. The manager broadcasts state and transition information to all registered components. Each component takes its appropriate action and reports back to the manager.

Many such systems may use the concept of a listener. In these systems, components may register with the manager to 'listen for' events or other messages of interest. In current de-coupled systems, there is no means to ensure that a component expected to publish or broadcast an event or message is, in fact, alive and capable of doing so. Quite possibly, components may be listening for events or messages that can never happen because the would-be source has failed to initialize or start. Other components that are listening will never know that a required component is not there. Without some means to guarantee registration, there is no way for the manager to know about failed components.

BRIEF SUMMARY OF THE INVENTION

In accordance with an embodiment of the present invention, a method for registration in a de-coupled environment or system may include providing an identity of a spawned component to a manager, controller or the like. The method may also include taking a predetermined action in response to the spawned component failing to report its status to the manager or controller after a preset time period.

In accordance with another embodiment of the present invention, a system for registration in a de-coupled environment or system may include a component adapted to provide an identity of a spawned component. The system may also include a manager, controller or the like adapted to receive the identity of the spawned component and to take a predetermined action in response to the spawned component failing to report its status after a predetermined time period.

In accordance with another embodiment of the present invention, a computer program product for registration in a de-coupled environment may include a computer useable medium having computer useable program code embodied therein. The computer useable medium may include computer useable program code configured to provide an identity of a spawned component to a manager, controller or the like. The computer useable medium may also include computer useable program code configured to take a predetermined action in response to the spawned component failing to report its status to the manager after a preset time period.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
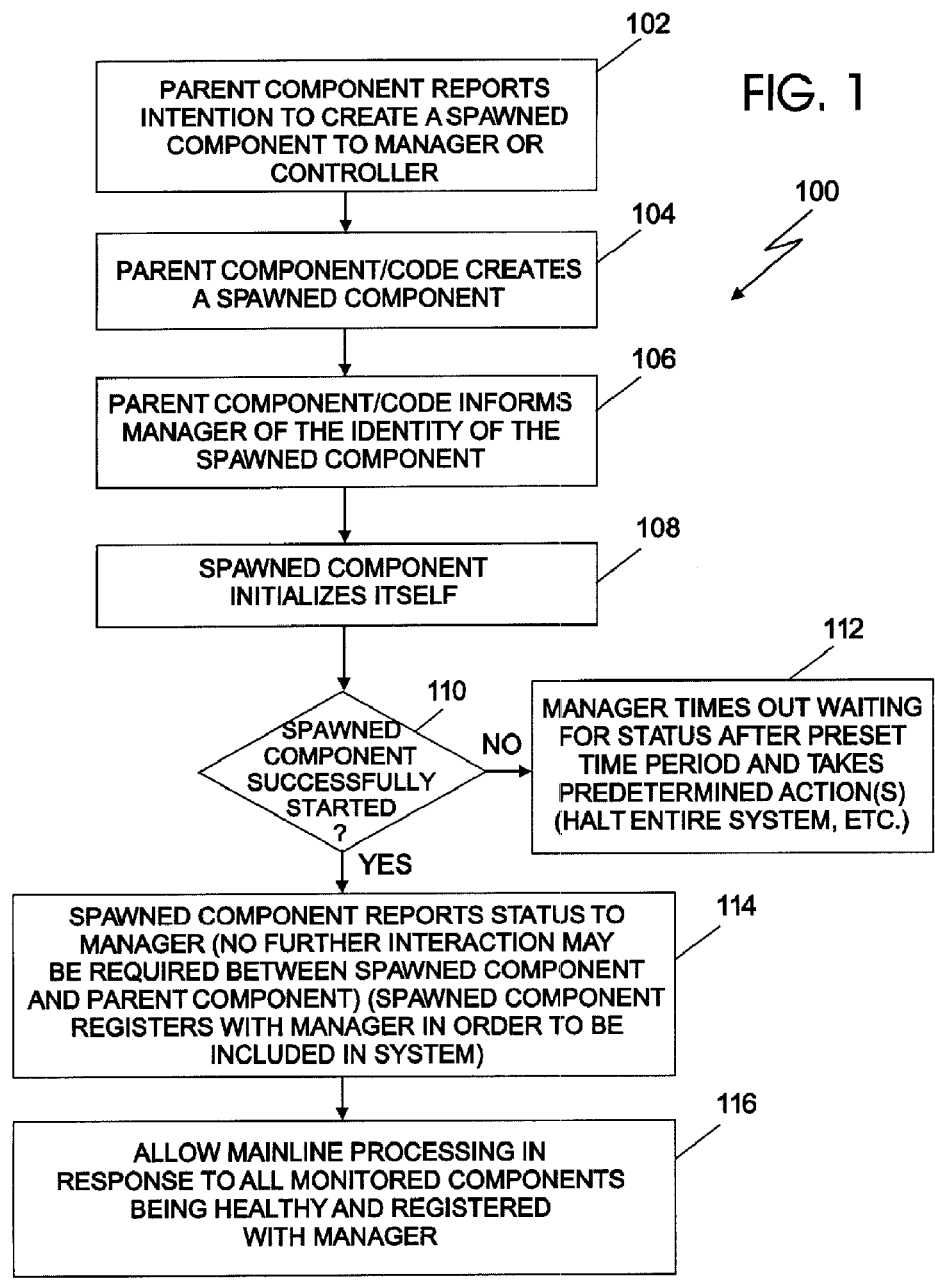
FIG. 1 is a flow chart of an example of a method for registration in a de-coupled environment or system in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer useable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 for registration in a de-coupled environment or system in accordance with an embodiment of the present invention. In block 102, a parent component may report an intention to create a spawned component to a manager. The manager may be any component of a system that receives messages and events from other components and broadcasts messages and events to other components which have registered with the manager in a system. The manager may be a controller, graphical user interface (GUI) listener, publication/subscription recipient or similar device or computer-executable code. A parent component may be any component that forms part of a de-coupled system and a spawned component may be any component that is created or spawned by another component in a de-coupled system or environment. Examples of a parent component and spawned component may include spawned threads, spawned processes or the like. In block 104, a parent component or computer-executable code included in the parent component may create or spawn the component.

In block 106, the parent component or code may inform the manager of an identity of the spawned component. A message or signal may be sent from the parent component to the manager including the identity of the spawned component or child component to be spawned. The operations of blocks 104 and 106 may be performed in any order. In block 108, the spawned component may initialize itself.

In block 110, a determination may be made whether the spawned component successfully started. If the spawned component failed to start, the method 100 may advance to block 112. In block 112, the manager may time out in response to not receiving a status from the spawned component after a preset time period. The manager may also take a predetermined action in response to timing out or not receiving the status indication from the spawned component after the preset time period. The predetermined action or actions may include halting the system, not allowing mainline processing by the system, advising other active components of the failure, attempting corrective action or similar actions.

If the spawned component successfully starts in block 110, the spawned component reports its status to the manager in block 114. No further interaction may be required between the spawned component and the parent component. Although, such interaction may occur under some circumstances or in some systems. The spawned component may also register with the manager in order to be included in the system and to receive messages or notice of events from the manager.

In block 116, mainline processing may be allowed in response to all monitored components being healthy and registered with the manager. The monitored components may include all parent and spawned components.

Figure 2:
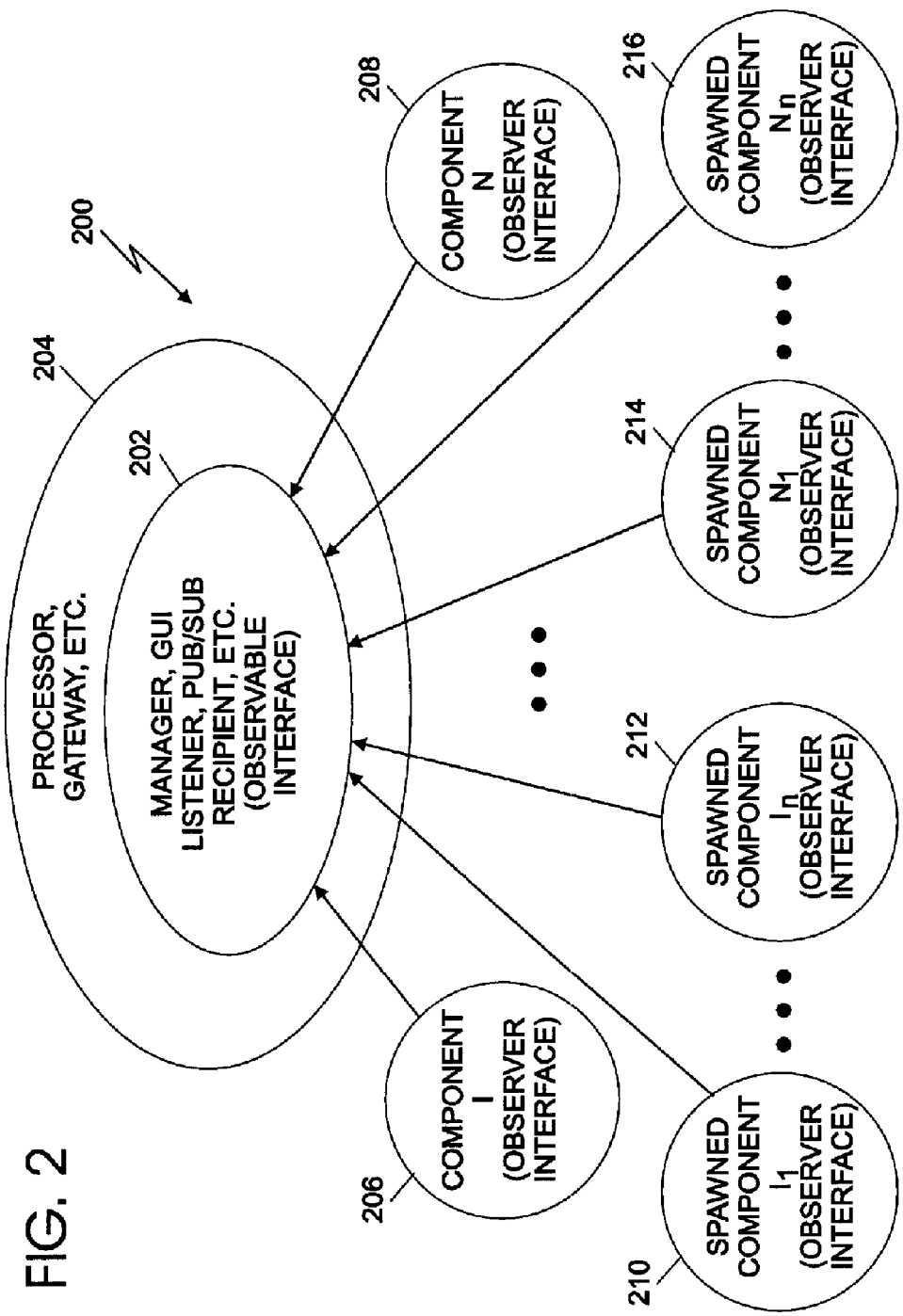
FIG. 2 is a block schematic diagram of an exemplary system for registering components in a de-coupled environment in accordance with an embodiment of the present invention.

FIG. 2 is a block schematic diagram of an exemplary system 200 for registering components in a de-coupled environment in accordance with an embodiment of the present invention. The method 100 may be embodied in and performed by the system 200. The system 200 may include a manager 202, such as a state manager, controller, graphical user interface (GUI) listener, publication/subscription recipient or the like. The manager 202 may include an observable interface, such as a Java observable interface or the like. An observable interface or observable object may be any object whose state may be of interest, and in whom other objects or components may register an interest. The manager 202 may be operable on a processor 204, gateway or similar device, software system, hardware system or combination of these.

The system 200 may also include one or more components, such as component I 206 and component N 208. As previously discussed a component may be any part of a de-coupled system. Each component may include an observer interface, such as a Java observer interface or the like, to permit the component to be notified when a state of another component changes or some other occurrence that may affect the component. Each component 206 and 208 may spawn or create one or more child or spawned components 210-216 or may not spawn or create any child or spawned components. For example, component I 206 may create spawned components $I_i$-$I_n$ 210-212 and component N 208 may create spawned components $N_i$-$N_n$ 214-216. As discussed with respect to method 100 in FIG. 1, each parent component 206 and 208 reports an intention to create a spawned component 210-216 to the manager 202. The parent component 206 or 208 then creates each spawned component 210-216. The parent component 206 or 208 also informs the manager 202 of the identity of each spawned component 210-216. Each spawned component may also include an observer interface.

Each spawned component 210-216 may initialize itself and then report a status to the manager 202 as discussed with reference to block 114 in FIG. 1. If any of the spawned components 210-216 fail to start, the manager 202 may perform a predetermined action in response to not receiving a status from any of the spawned components 210-216 after a preset time period as previously discussed with respect to FIG. 1.

Figure 3:
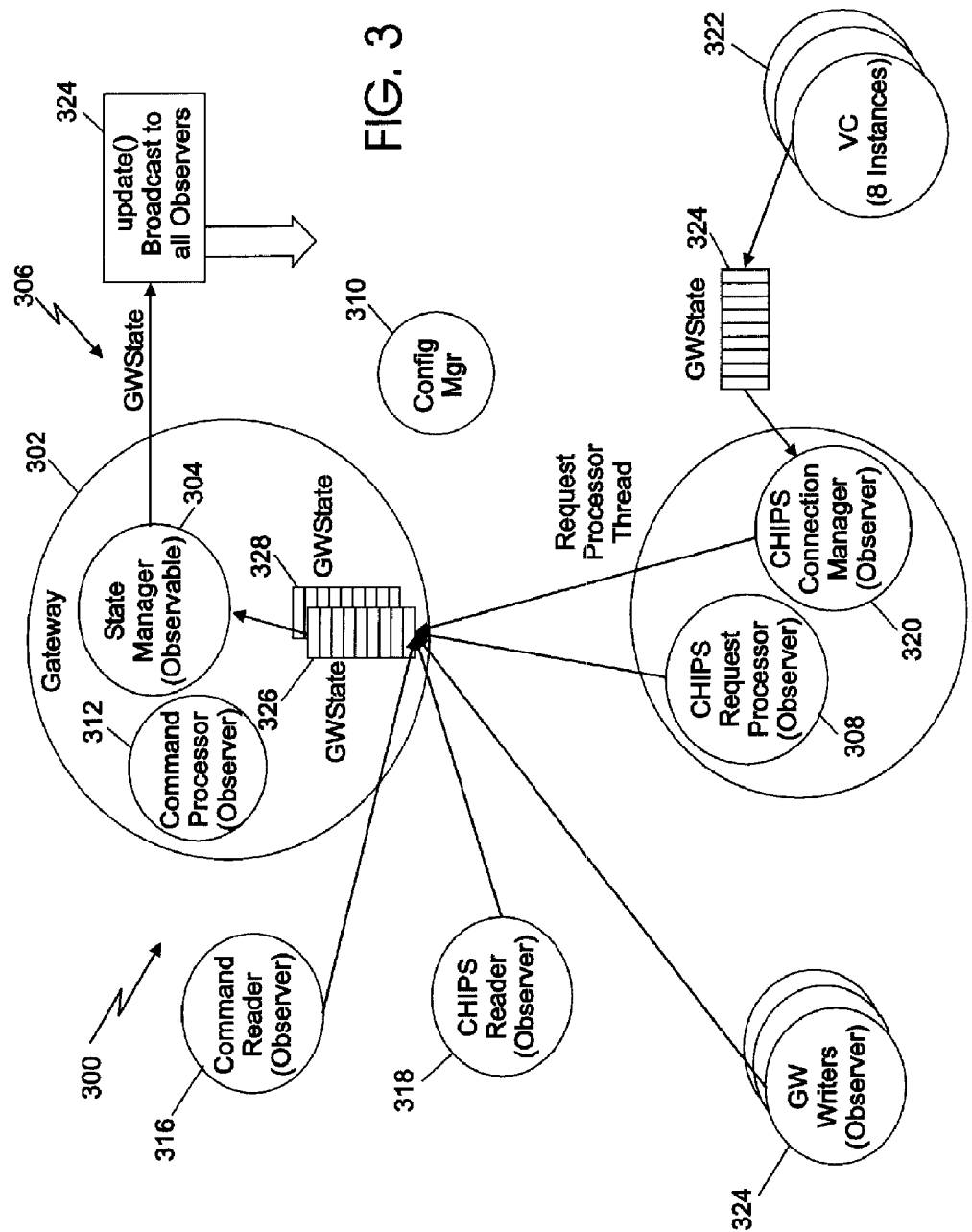
FIG. 3 is a block schematic diagram of another exemplary system for registering components in a de-coupled environment in accordance with another embodiment of the present invention.

FIG. 3 is a block schematic diagram of another exemplary system 300 for registering components in a de-coupled environment in accordance with another embodiment of the present invention. The system 300 is an illustration of an X25 Gateway State Manager and observers or components that may be used for a Clearing House Interbank Payments System (CHIPS) or the like. CHIPS is a premier bank-owned payments system for clearing large value payments. A gateway 302 may include a state manager 304. The interaction of the state manager 304 with other 'state aware' subsystems in the gateway 302 or system 300 is illustrated in FIG. 3. The state manager 304 may transmit a gateway (GW) state 306 to all components 308-322 or observers by an update broadcast 324. The gateway design and implementation may control the state of the different observers or components 308-322 by using instances of classes that implement observable and observer interfaces, such as Java observable and observer interfaces or similar interfaces.

As each parent component, such as gateway 302 or CHIPs request processor 308 are about to create and start a spawned component 310-322, the parent component or parent component code informs the state manager 304 of the name of the spawned component 310-322, similar to that previously described with respect to method 100 of FIG. 1. When the spawned component 310-322 initializes itself and processing in the component gets to a point where the component is successfully started, the spawned component 310-322 reports its status to the state manager 304. If the spawned component 310-322 fails at startup in such a way that it cannot report status, the state manager 304 times out waiting for status from the spawned component 310-322 and may begin a halt process to stop the system 300. Queues may be used to pass state information 326 and status information 328 to the state manager 302.

Figure 4:
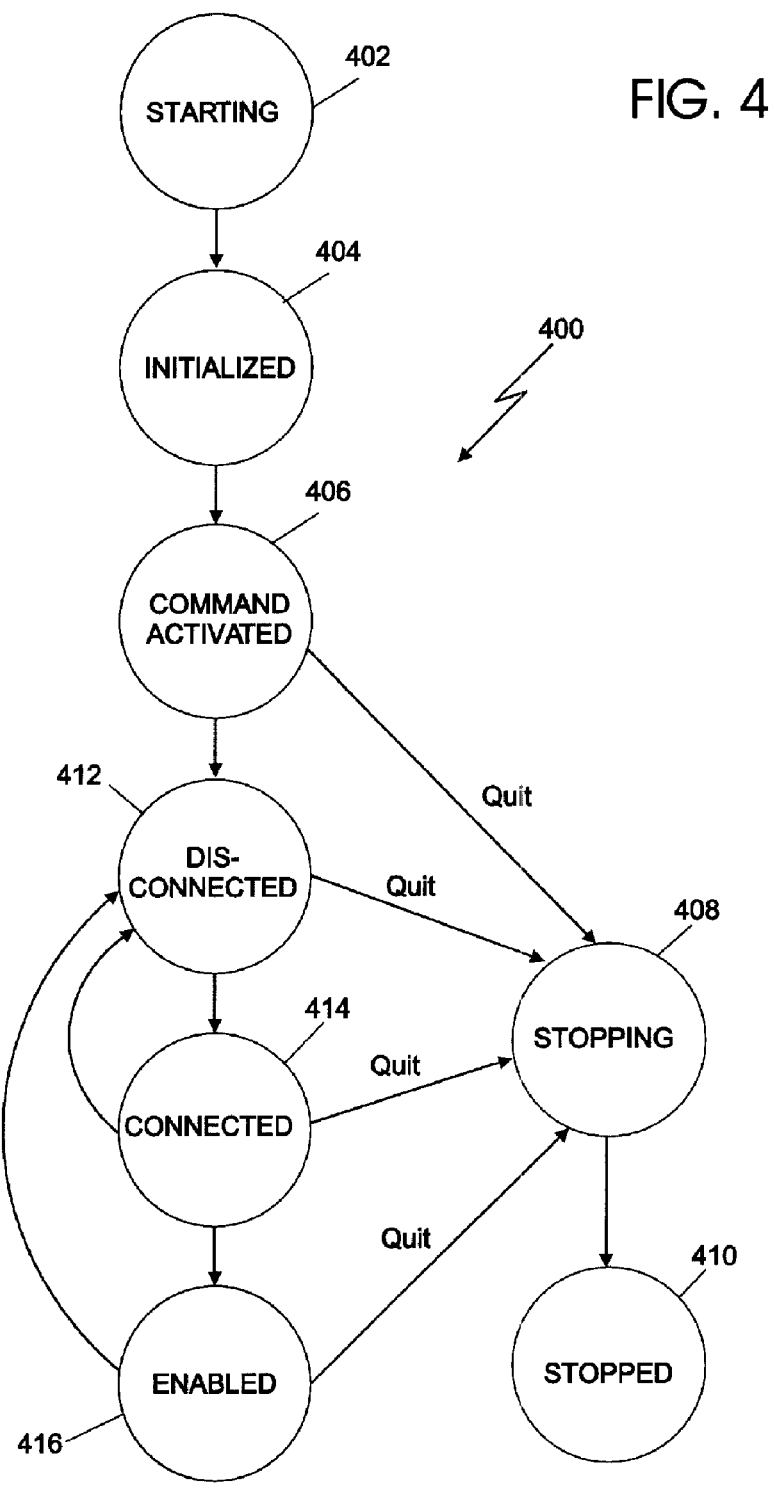
FIG. 4 is an example of a state machine illustrating operation of the system of FIG. 3.

Referring also to FIG. 4, FIG. 4 is an example of a state machine 400 illustrating operation of the system 300 of FIG. 3. In block 402, the system 300 is starting. Gateway Main 302 may create a configuration manager 310 and obtain configuration for the system 300. The state manager 304, a command processor 312, common or gateway writers 314 and CHIPs request processor 308 may be created. The state manager 304 waits until all components report initialization.

In block 404, the state manager 304 issues an initialized state notification and may issue an activate command. The command writer 314 and a command reader 316 are activated. In block 406, the state manager 304 may issue a command activated state notification in response to the command or GW writers 314 and command reader 316 reporting activation. The state manager 304 monitors all readers 316, 318 and writers 314, a connection manager 320 and the CHIPs request processor 308 via state queues 326. If any component reports being stopped, the system 300 is stopped and state manager 304 issues a stopping state notification and the gateway 302 is in a controlled stop state in block 408. The system 300, including all subsystems, is in a stopped state in block 410.

The connection manager 304 moves to a disconnected state in response to the connection manager 320 reporting being disconnected. The state manager 304 issues a disconnected state notification and all connections are inactive in the disconnected state in block 412.

In block 414, the state manager 304 may issue a connection state notification in response to at least one connection being active. The state machine 400 may return to block 412 in response to the connection manager 320 reporting a disconnect and the state machine 400 may proceed as previously described.

In block 416, the state manager 304 may issue an enable notification. The system 300 is in an enabled state in response to the CHIPs reader 318 and writers 314 reporting being enabled. The state machine 400 may return to block 412 in response to the connection manager 304 reporting a disconnect. The state machine 400 may then proceed and previously described.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for registration in a de-coupled environment, comprising:
    reporting an intention to create a spawned component from a parent component to a manager, wherein the manager comprises an observable interface and the parent component comprises an observer interface;
    creating the spawned component by the parent component;
    providing an identity of the spawned component to the manager by the parent component that spawns the spawned component;
    self-initializing by the spawned component;
    allowing the spawned component to report its status to the manager in response to successfully starting;
    taking a predetermined action by the manager in response to the spawned component failing to report its status to the manager after a preset time period, wherein the predetermined action comprises one of: halting a system, halting mainline processing by the system, advising other active components of the failure, and attempting corrective action;
    registering the spawned component with the manager in order to include the spawned component in the system; and
    allowing mainline processing in response to all monitored components of a plurality of components being healthy and registered with the manager.

* * * * *